United States Patent
Mironov (10) Patent No.: US 9,291,151 B2
(45) Date of Patent: Mar. 22, 2016

(54) WIND TURBINE BLADE AND ITS PRODUCING METHOD

(75) Inventor: Gabriel Mironov, Montreal (CA)

(73) Assignee: SUZHOU RED MAPLE WIND BLADE MOULD CO., LTD., Jiangsu (CN)

( * ) Notice: Subject to any disclaimer, the term of this patent is extended or adjusted under 35 U.S.C. 154(b) by 825 days.

(21) Appl. No.: 13/497,862

(22) PCT Filed: Sep. 20, 2010

(86) PCT No.: PCT/CN2010/001450
§ 371 (c)(1),
(2), (4) Date: Jun. 1, 2012

(87) PCT Pub. No.: WO2011/035541
PCT Pub. Date: Mar. 31, 2011

(65) Prior Publication Data
US 2012/0237356 A1    Sep. 20, 2012

(30) Foreign Application Priority Data
Sep. 23, 2009    (CN) .......................... 2009 1 0175882

(51) Int. Cl.
*F03D 3/06*    (2006.01)
*F03D 1/06*    (2006.01)
(Continued)

(52) U.S. Cl.
CPC .............. *F03D 3/062* (2013.01); *B29C 70/342* (2013.01); *B29D 99/0028* (2013.01); *F03D 1/0675* (2013.01); *B29C 65/483* (2013.01); *B29C 66/1312* (2013.01); *B29C 66/532* (2013.01); *B29C 66/54* (2013.01); *B29C 66/61* (2013.01); *B29C 66/71* (2013.01); *B29C 66/712* (2013.01); *B29C 66/721* (2013.01); *B29C 66/7212* (2013.01); *B29L 2031/085* (2013.01);
(Continued)

(58) Field of Classification Search
CPC ...................................................... F03D 3/062
USPC .......... 416/229 R, 230, 241 R, 241 A, 241 B; 29/889.7, 889.71, 419.1
See application file for complete search history.

(56) References Cited

U.S. PATENT DOCUMENTS 7,895,746 B2 *   3/2011   Bech et al. ................. 29/889.7
7,988,423 B2 *   8/2011   Hancock ................. 416/229 R
(Continued)

FOREIGN PATENT DOCUMENTS

CN         101058236 A        10/2007
IE    WO 2008010198 A1 *  1/2008  .............. B29C 70/02
JP         2008207545 A  *  9/2008

OTHER PUBLICATIONS

Machine translation of JP 2008207545 A (Sep. 11, 2008) from JPO.*
(Continued)

*Primary Examiner* — Ninh H Nguyen
*Assistant Examiner* — Christopher R Legendre
(74) *Attorney, Agent, or Firm* — Novak Druce Connolly Bove + Quigg LLP (57) ABSTRACT

The present invention provides a wind turbine blade of hybrid material composition, wherein the blade comprises a structural box mainly made of a epoxy based prepreg and a shell manufactured by resin infusion technique using polyester or vinylester, and the box and the shell are bonded using an adhesive that is not a polyester, a vinylester and an epoxy. The present invention also provides a method for producing such a blade.

13 Claims, 6 Drawing Sheets

(51) Int. Cl.
    *B29C 70/34*     (2006.01)
    *B29D 99/00*     (2010.01)
    *B29C 65/00*     (2006.01)
    *B29L 31/08*     (2006.01)
    *B29C 65/48*     (2006.01)

(52) U.S. Cl.
    CPC ..... *F05B2280/6003* (2013.01); *F05C 2253/04* (2013.01); *Y02E 10/721* (2013.01); *Y02E 10/74* (2013.01); *Y10T 156/10* (2015.01)

(56) References Cited

U.S. PATENT DOCUMENTS

| | | | |
|---|---|---|---|
| 8,454,791 B2* | 6/2013 | Gau | 156/297 |
| 8,777,578 B2* | 7/2014 | Hancock | B25B 11/02 416/226 |
| 8,777,579 B2* | 7/2014 | Hancock | B25B 11/02 416/233 |
| 8,899,936 B2* | 12/2014 | Hancock | B25B 11/02 29/889.72 |
| 2005/0214122 A1 | 9/2005 | Sorensen et al. | |
| 2005/0257956 A1* | 11/2005 | Marshall et al. | 174/260 |
| 2007/0036659 A1* | 2/2007 | Hibbard | 416/233 |
| 2007/0040294 A1* | 2/2007 | Arelt | 264/136 |
| 2007/0251090 A1* | 11/2007 | Breugel et al. | 29/889.7 |
| 2008/0075603 A1 | 3/2008 | Van Breugel et al. | |
| 2009/0148655 A1* | 6/2009 | Nies | B29C 70/865 428/99 |
| 2009/0155084 A1* | 6/2009 | Livingston | B29C 65/54 416/223 R |
| 2010/0098549 A1* | 4/2010 | Mironov | 416/229 R |
| 2011/0116935 A1* | 5/2011 | Wansink | 416/229 R |
| 2011/0142663 A1* | 6/2011 | Gill | 416/226 |
| 2012/0114497 A1* | 5/2012 | Petersen | F03D 1/0675 416/241 R |
| 2012/0237356 A1* | 9/2012 | Mironov | 416/232 |
| 2013/0280088 A1* | 10/2013 | Appleton | 416/241 R |
| 2015/0198051 A1* | 7/2015 | Hayden | B29C 70/84 416/226 |
| 2015/0308404 A1* | 10/2015 | Dahl | B29C 70/543 416/230 |

OTHER PUBLICATIONS

Theng, Chan Wai, "The Effects of Fibre Volume Fraction of Composite Plate". Faculty of Mechanical Engineering, Universiti Malaysia Pahang, Nov. 2007.*

Dec. 30, 2010 International Search Report and Written Opinion in related PCT/CN2010/001450.

* cited by examiner

WIND TURBINE BLADE AND ITS PRODUCING METHOD

TECHNICAL FIELD

The present invention relates to a wind turbine blade and a method for producing such a blade.

BACKGROUND TO THE CURRENT INVENTION

The wind power industry has long seen three main approaches to the structural design and production of wind turbine blades:

1. Production of the blade by resin infusion using polyester or vinyl ester resin. In such blades, the shell and the cap layers of the structural box caps are made in a single infusion process, then joined with shear webs (see illustrations section). The aerodynamic shell and the structural box caps are not independent parts, and the whole body is infused with the same resin. Such structure has the disadvantage that the inferior fatigue and strength properties of the lower cost resins mean that more volume of laminate must be used, resulting in a heavier blade. Further, such structure has the disadvantage of possessing areas of critical structural bonding, placing a high requirement on the strength of the bonding adhesive and good preparation of the surfaces to be joined, by grinding or other roughening techniques. Such structure requires well trained and monitored workers to prevent the development of quality defects during the production process. The process is prone to occurrence of air inclusions in the resin, wrinkles in the dry fiberglass, oversized or poorly matched structural bond lines, and failed structural bonding due to surface contamination or insufficient surface roughening. These common faults have been sources of numerous blade failures in service over the past 2 decades.

2. Production of the blade by resin infusion or hand lamination, using epoxy resin. In such process, the cap layers of the structural box are produced in a first 'prefab' step, then the 'prefab' is laid into the structural shell, which subsequently completely envelopes the 'prefab' parts. The aerodynamic shell and the structural box are not independent parts. Such structure has the disadvantage of using more expensive epoxy resin throughout, while achieving only mid-level fatigue and strength properties. Further, such structure shares all the disadvantages of method 1, regarding the structural bonding and quality control problems. The only real difference from method 1 is a use of a more expensive resin matrix to generate some weight savings.

3. Production of the structural box in a single piece by laying epoxy-fiberglass and/or epoxy-carbon fiber prepreg layers onto a box shaped male mandrel. A separate non structural shell from similar type epoxy based prepreg material is formed in two halves using other moulds. Then The shells and the structural box are bonded together. However, as the shell is not a load carrying member, but merely an aerodynamic fairing, the joint is not a load carrying structural bond. The standards for joint preparation and adhesive strength can therefore be relaxed considerably. This production technique eliminates much of the quality control risk associated with methods 1 & 2. Air inclusions and wrinkles can be eliminated altogether, while the issue of bonding quality becomes much less important. However, this approach results in considerably higher cost, since costly multi-axial prepreg is also used for the non-structural shell, where superior structural properties provide little benefit. Further, because the prepreg shell material requires a higher curing temperature, more expensive high temperature resistant SAN (styro acryl nitrile), PVC (poly vinyl chloride) or PET (polyethylene terephthalate) foam core must be used within the blade shell sandwich laminate, in place of the balsa wood or low cost foam preferred for methods 1 & 2. Also, the shell moulds need to be capable of higher temperatures in order to cure the prepreg material, adding additional cost.

SUMMARY OF THE INVENTION

The present invention aims to combine the low cost of method 1 with the high quality of method 3, and overcome the difficulty of joining the dissimilar materials using novel adhesives.

Heretofore, no use has been made of a wind turbine blade having a monolithic epoxy prepreg based structural box and a polyester or vinylester infused shell, joined by using methyl methacrylate or polyurethane adhesive.

According to an aspect of the present invention, a wind turbine blade of hybrid material composition is provided, wherein the blade comprises a structural box mainly made of a epoxy based prepreg and a shell manufactured by resin infusion technique using polyester or vinylester, and the box and the shell are bonded using an adhesive that is not a polyester, a vinylester and an epoxy.

According to an embodiment, the box and the shell are made separately.

According to the present invention, the adhesive is methyl methacrylate or polyurethane.

According to an embodiment, the structural box material is, by weight, made up of more than 75% materials selected from the following group: epoxy carbon fiber unidirectional prepreg, epoxy fiberglass unidirectional prepreg, epoxy basalt fiber unidirectional prepreg.

According to another aspect of the present invention, a method of producing the wind turbine blade as stated above is provided, comprising steps: forming the structural box from epoxy based prepreg; forming the shell from polyester or vinylester resin using a resin infusion technique; applying an adhesive that is not a polyester, a vinylester and an epoxy; bonding the structural box and the shell together.

According to an embodiment, the forming of the structural box uses a semirigid inflatable bladder.

According to an embodiment, a mould for forming the shell is coated with gelcoat.

The new blade structure has the following advantages:

1. An optimal distribution of high strength resin matrix in critical areas, low cost resin matrix in non-critical areas, and the two being joined by use of a third resin type as an adhesive.

2. Avoidance of quality problems caused by wrinkles and air inclusions in the laminate layers by using prepreg to make up the structural box.

3. Potential savings of labor cost during production by using polyester gelcoats instead of painting.

BRIEF DESCRIPTION OF DRAWINGS

The present invention will now be described in detail by way of non-limiting example and with reference to the accompanying drawings. FIGS. 1-13 shows in sequence a process for producing the blade according to the present invention, wherein:

PREFERRED EMBODIMENT

Generally, a wind turbine blade comprises a structural box and a shell consisting of an upper shell part and a lower shell part. The structural box is a load carrying member, and the shell is not a load carrying member, but merely an aerodynamic fairing. According to the present invention, the structural box and the shell are independent parts that are made by using separate moulds.

Now, a description will be first given to the production of the structural box with reference to FIGS. 1-10.

Figure 1:
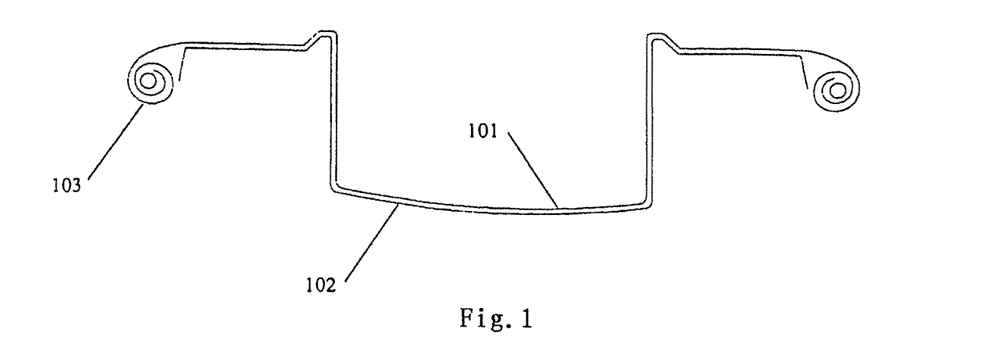
FIG. 1 shows the first step of the process.

A lower structural box mould 102 is provided for forming a lower half of the structural box. Outer cover layers 101 of the lower half of the structural box, made up of multiaxial prepreg material, are laid into the lower structural box mould 102. Excess material 103 is left rolled up on both sides of the mould cavity.

Figure 2:
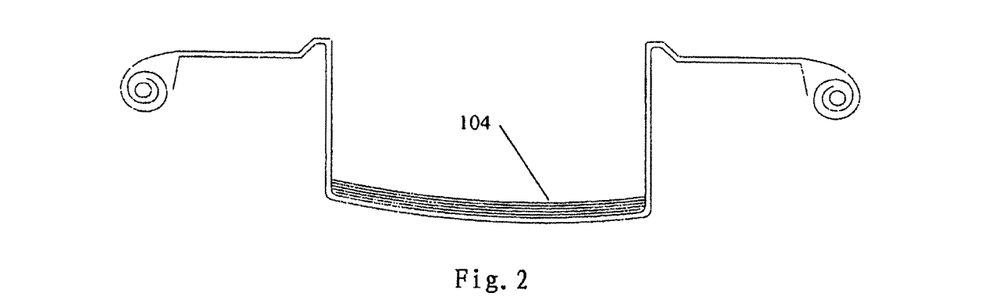
FIG. 2 shows the second step of the process.

Then, cap layers 104 of the lower half of the structural box, made up of unidirectional prepreg, are stacked into the bottom of the lower structural box mould.

Figure 3:
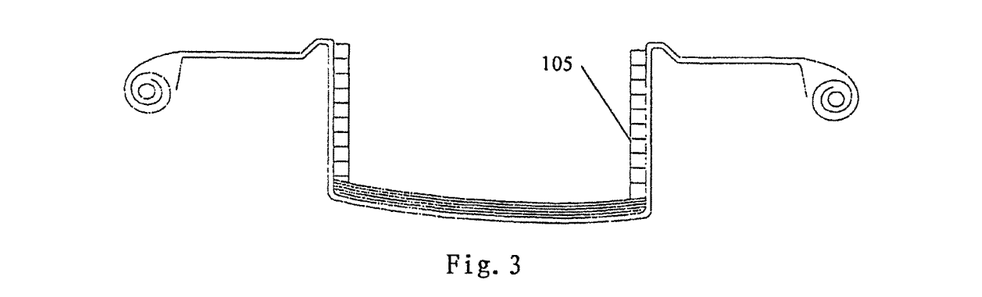
FIG. 3 shows the third step of the process.

Then, core material 105 for the lower half of the structural box side sandwich structure is applied on the sides of the lower structural box mould. Local air heating of the prepreg material, e.g. with a hair dryer, achieves enough tackiness of the surface to allow the core material to be fixed in place.

Figure 4:
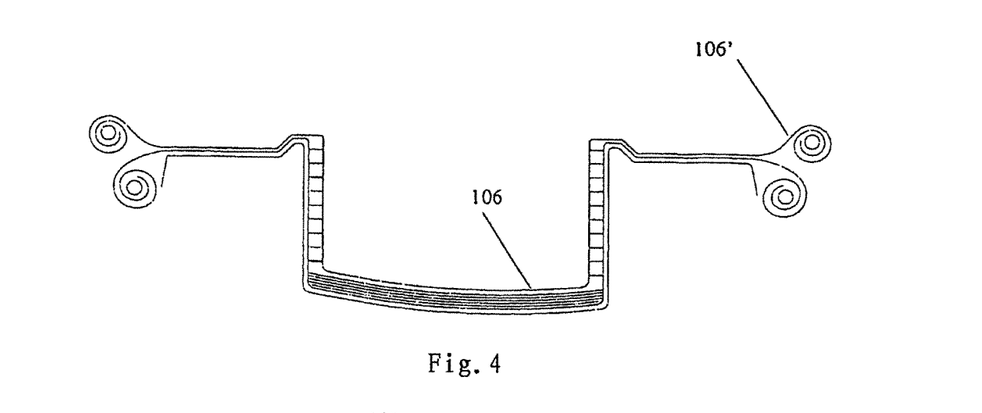
FIG. 4 shows the fourth step of the process.

Then, inner cover layers 106 of the lower half of the structural box, made up of multiaxial prepreg material, are laid into the structural box mould. Excess material 106' is also left rolled up on both sides of the mould cavity. Thus, the lower half of the structural box is finished.

Figure 5:
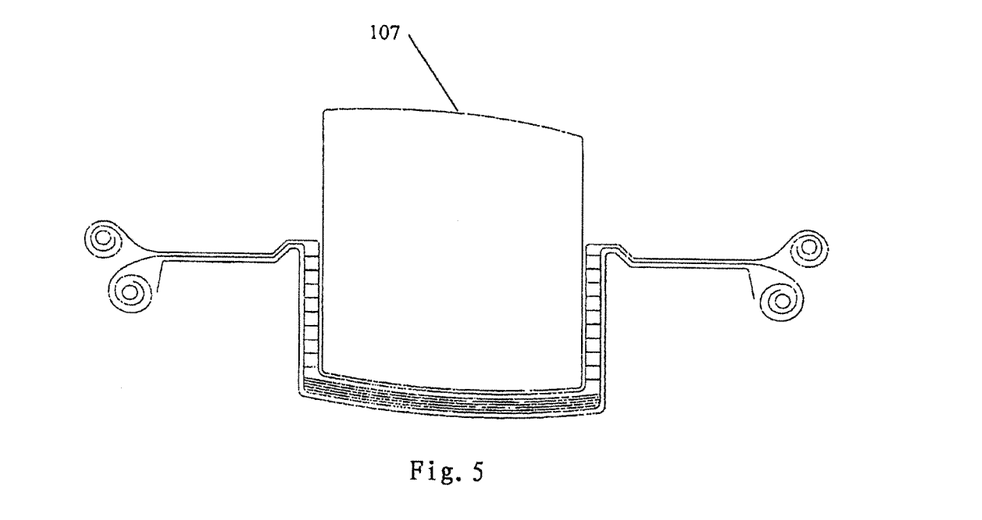
FIG. 5 shows the fifth step of the process.

Next, a semirigid inflatable bladder 107, used as a mandrel and made of vulcanized rubbery material, is lowered into the structural box lower mould 102. The bladder 107 will later be inflated to a pressure slightly over the atmospheric level, so as to assume a rectangular shape fitting to the inside of the structural box.

Figure 6:
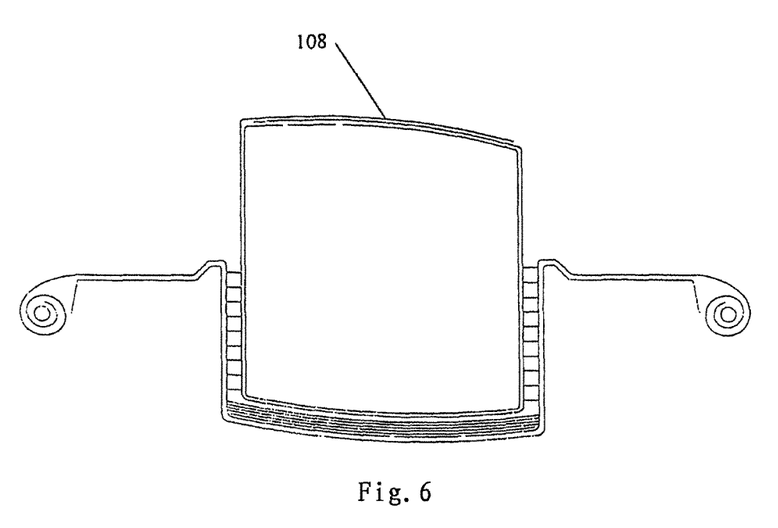
FIG. 6 shows the sixth step of the process.

Then, the excess material 106' of the inner cover layers of the lower half of the structural box are folded over the top of the bladder, serving as folded over inner cover layers 108 of the upper half box, then heated somewhat so that they will stay tacked in place.

Figure 7:
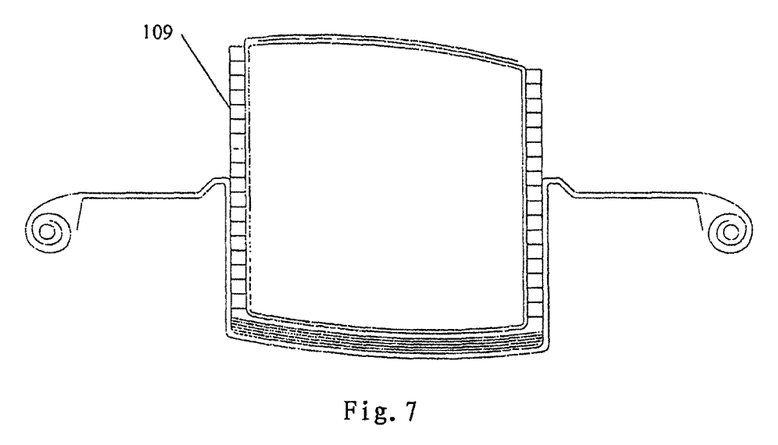
FIG. 7 shows the seventh step of the process.

Then, core material. 109 for the upper half of the structural box side sandwich structure is applied on the sides of the bladder. Heating of the prepreg is used to tack the core material in place.

Figure 8:
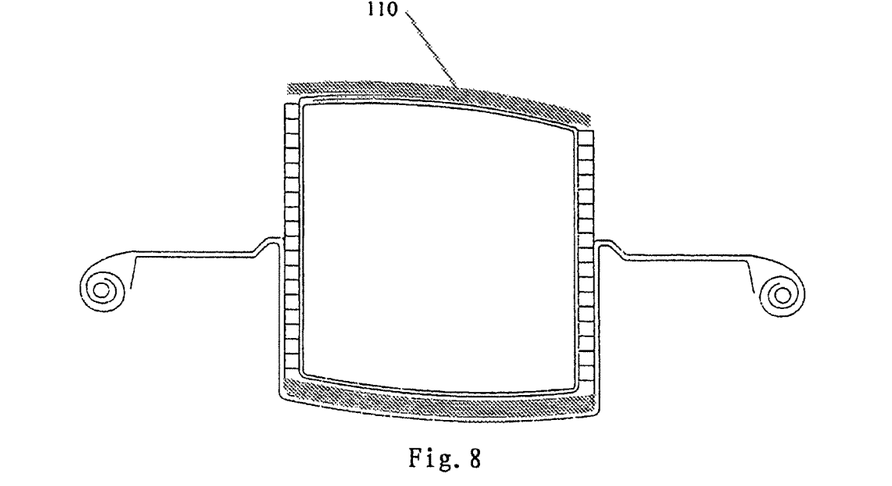
FIG. 8 shows the eighth step of the process.

Then, cap layers 110 of the upper half of the structural box are stacked on top of the bladder.

Figure 9:
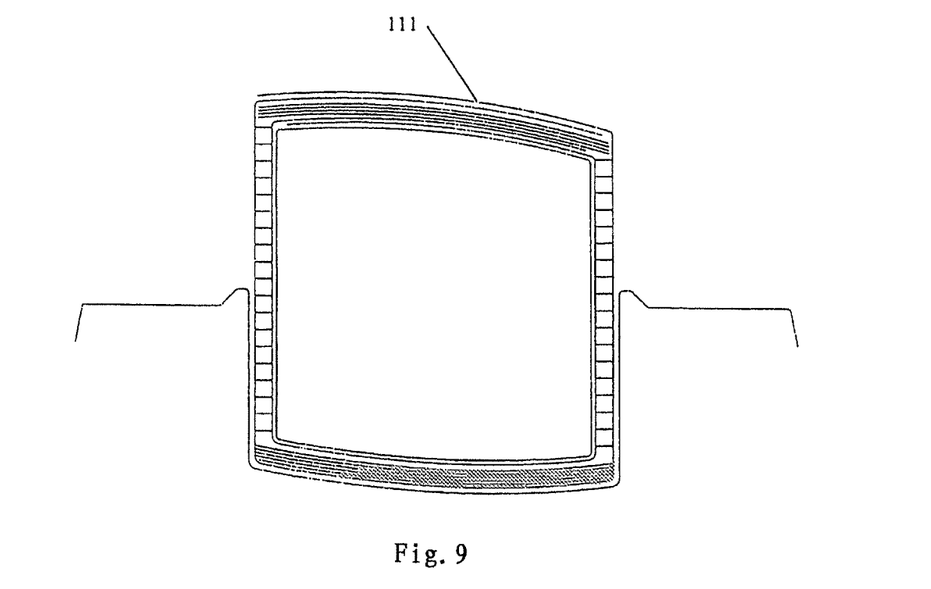
FIG. 9 shows the ninth step of the process.

Then, the excess material 103 of the outer cover layers of the lower half of the structural box are folded over on top of the bladder and the upper half box cap layers, serving as folded over outer cover layers 111 of the upper half box, and heating so that they will stay tacked in place. Thus, the upper half box is finished.

Figure 10:
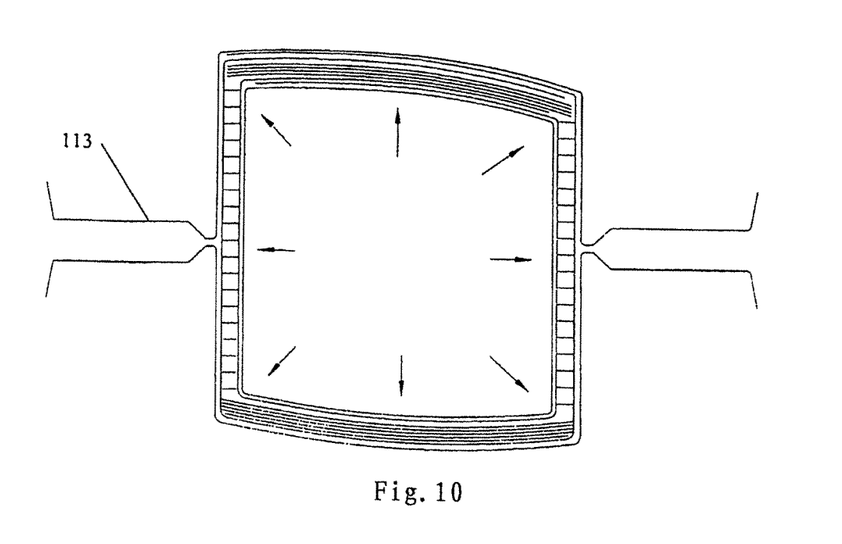
FIG. 10 shows the tenth step of the process.

Then, an upper mould 113 of the structural box is lowered on top of the bladder, then clamped strongly all around together with the lower mould 102. The upper and lower moulds 113, 102 are tightly sealed and a vacuum is evacuated between the bladder 107 and the moulds. The bladder is then pressurized to several times, e.g. 2-4 times of the atmospheric pressure to further consolidate the prepreg material. The moulds are then heated to cause curing of the lamination. The whole structural box is processed at a temperature of about 120 C for a time according to the prepreg resin system manufacturer's specification. Due to the strong compaction effect so achieved, voids, dry spots, wrinkles and other internal defects may be almost entirely eliminated.

Thus, the whole box is finished and removed from the moulds for later use.

According to the present invention, the outer cover layers and inner cover layers for the lower half and upper half of the structural box are composed of from 2-8 layers of epoxy-fiberglass multiaxial prepreg, depending on the blade size and the cross section position along the blade span. Sizing will be conducted in view of the local shear loads, to resist fatigue loading, extreme loads, and buckling. The preferred fiberglass material is stitched biaxial glass, so arranged that the fibers are at +/−45 degrees to the final blade axis, and therefore optimally oriented to carry shear loads on the side walls of the structural box, which function as the shear webs of the beam. A preferred basis weight for the dry multiaxial fiberglass cloth is from 600-2000 g/m2, with 800 g/m2 or 1000 g/m2 being optimal in terms of flexibility and easy handling character. A suitable production is Gurit WE90 prepreg, using 1000 g/m2 biaxial fiberglass with 72GPA modulus E-glass rovings.

The structural box cap layers for the upper half and the lower half are composed from 1-80 layers of heavy weight unidirectional epoxy fiberglass prepreg, epoxy carbon fiber prepreg or epoxy basalt fiber, depending on the blade size and the cross section position along the blade span. Sizing will be conducted in view of the deflection, fatigue strength, and buckling resistance requirements of the box spar cap at that location. The preferred fiberglass material is unidirectional, so arranged that the fibers are more or less parallel to the final blade axis. The preferred basis weight of dry fiber from 1200-4000 g/m2, with 1600 g/m2 being optimal in terms of handling character and availability in the marketplace. A suitable product is Gurit WE91-1 prepreg using Owens Corning ECR glass SE1500 roving with minimum 76GPA tensile modulus and having a roving basis weight of 1600 g/m2.

The lightweight upper and lower sandwich core materials serving as side walls of the structural box have a thickness from 6-40 mm, depending on the blade size and the cross section position along the blade span, which will dictate the section thickness needed to prevent buckling of the side wall. The preferred core material is PET (polyethylene terephthalate) foam, due to its superior thermal stability during processing. A suitable density is from 80-120 kg/m3, with 105 kg/m3 being especially preferred. A suitable product is Baltek Airex T92.100.

Figure 11:
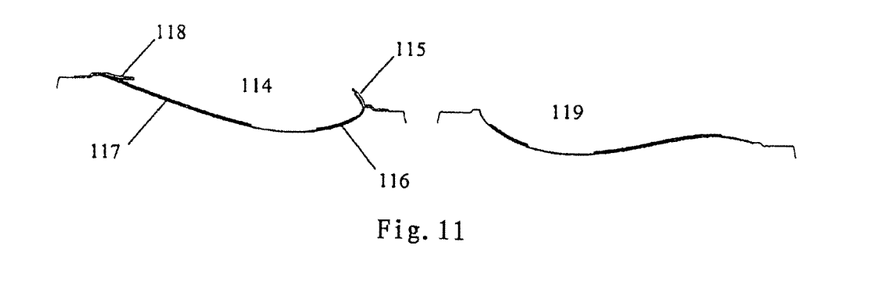
FIG. 11 shows the eleventh step of the process.

Next, a description will be given to the forming of the nonstructural shell with reference to FIG. 11.

The shell consists of a lower part 114 and an upper part 119, which are respectively made using a lower shell mould and an upper shell mould separate from the box moulds. The lower part of the nonstructural shell is laminated from dry cloth and lightweight core material, and then, by methods well known in the industry, infused with the low cost resin. The return flange portions of the lower part of the nonstructural shell are formed during this resin infusion step using additive flange moulds fixed onto the lower mould. As shown in FIG. 11, the lower shell part 114 comprises a leading edge additive flange 115, a leading edge sandwich structure portion 116, a trailing edge sandwich structure portion 117, a central portion between the leading edge sandwich structure portion 116 and the trailing edge sandwich structure portion 117, and an optional trailing edge additive flange 118. The upper shell part 119 is similar to the lower shell part 114, except for the leading edge additive flange 115 and the optional trailing edge additive flange 118.

Each of the upper and lower blade shell moulds is coated with approximately 500 microns of polyester gelcoat by spray technique. This will later form the outer surface of the blade, so avoiding labor intensive painting processes. A suitable gelcoat is DSM Neogel 9373.

The upper and the lower blade shell part each has from 2-5 outer layers, and from 2-5 inner layers of dry multiaxial fiberglass cloth, with either biaxial or triaxial orientation, or from some combination of biaxial and triaxial material, depending on the blade size and the cross section position along the blade span, which will dictate the needed strength of the blade shell fairing. A suitable lamination for most areas of the blade shell, for a size range from 35-50 m in length, is often 2 layers on each side of the sandwich, each layer consisting of 1200 g/m2 triaxial fabric, oriented so that the unidirectional fibers are roughly 90 degrees to the blade axis, e.g. chordwise, and the biaxial fibers are at roughly +/−45 degrees to the blade axis. This then makes up a total of 4 layers, giving a basis weight of 4800 g/m2 for the dry fiberglass. Any number of suppliers may be used for such material, but a suitable product is Owens Corning EKT1200 (45/90/−45) E-6.

The additive flanges are formed from the same material layers as the blade shell, but without core material. Separate additive flange moulds are temporarily installed for this purpose, using fixing methods well known in the industry.

The sandwich core of the blade shell has a thickness from 6-50 mm, depending on the blade size and the cross section position along the blade span, which will dictate the needed strength of the blade shell fairing. A suitable low cost core material is PVC (poly vinyl chloride) foam, with a density of 60 kg/m3. A suitable thickness for most areas of the shell on blades from 35-50 m in length is 20 mm. A suitable product is Baltek Airex C70.55.

The blade shell is infused with low cost polyester or vinyl ester resin, still having adequate properties regarding strength, low shrinkage and high heat distortion temperature. The DCPD (dicyclopentadiene) type is preferred, having an optimal cost to performance ratio. A suitable grade is DSM Synolite 1967-G-6. The methods of conducting such resin infusion are well known in the industry.

Figure 12:
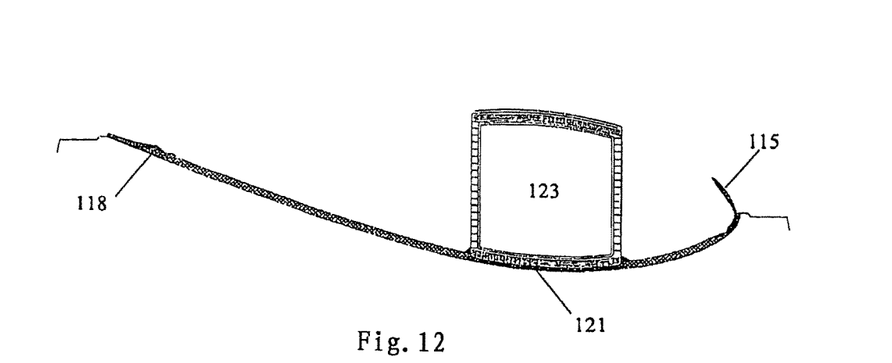
FIG. 12 shows the twelfth step of the process.
Figure 13:
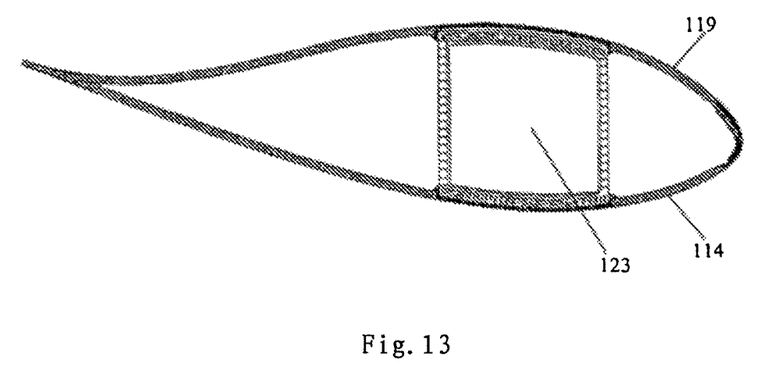
FIG. 13 shows the thirteenth step of the process.

Next, a description will be given to the bonding of the box and the shell with reference to FIGS. 12-13.

Firstly, the additive flange moulds are removed. After the lower shell part is cured, adhesive resin is applied on the central portion 121 of the lower shell part 114, and the structural box 123 is quickly lowered into place on top of the central portion of the lower shell part. Then, additional adhesive is applied on top of the structural box and also on the leading edge additive flange 115 and the optional trailing edge additive flange 118. Then, before the adhesive starts to cure, the upper and lower shell moulds are closed, and the upper shell part, the lower shell part and the box are bonded together. After the bonding adhesive is cured, the blade is removed from the mould and trimmed.

The bonding adhesive must be either a MMA (methyl methacrylate) or a PU (polyurethane) type in order to effectively join the dissimilar materials of the box and the shell. Much preferred is the MMA, due to quicker curing and more aggressive bonding. A suitable product is IPS Weld-on SS230 HV.

Alternative embodiments are possible, for example:
1. Various different weights and types of dry fabric reinforcement.
2. Various types of low cost polyester or vinyl ester resin.
3. Various types of foam core.
4. Various other methods of producing the structural box without use of the inflated bladder.

Within the scope and spirit of the present invention, one skilled in the art will understand that various changes and modifications can be made.

The invention claimed is:

1. A wind turbine blade of hybrid material composition, wherein the blade comprises a structural box and a shell each molded as independent parts and then bonded together to form the blade,
    the shell comprising an upper shell part and a lower shell part having inner layers respectively between which the structural box is adhesively bonded to form the blade,
    the shell is manufactured by resin infusion technique using polyester or vinylester,
    wherein the structural box includes inner and outer cover layers and between the cover layers, upper and lower cap layers and a sandwich core material serving as sidewalls between the upper and lower cap layers,
    the inner and outer cover layers are epoxy and multidirectional fiber prepreg,
    and the structural box is, by weight, made up of more than 75% materials selected from epoxy carbon fiber unidirectional prepreg, epoxy fiberglass unidirectional prepreg, and epoxy basalt fiber unidirectional prepreg,
    the box and the shell are bonded using an adhesive that is methyl methacrylate or polyurethane.

2. The blade of claim 1, wherein the cap layers are epoxy and unidirectional fiber prepreg.

3. The blade of claim 1, wherein the resin infused shell comprises a sandwich core between inner and outer layers of multiaxial fiber cloth.

4. The blade of claim 3, wherein the sandwich core of the shell is PVC foam.

5. The blade of claim 3, wherein the upper and lower shell parts include at least one of leading and trailing edge flanges bonded by the adhesive to secure the upper shell part to the lower shell part.

6. The blade of claim 1, wherein the adhesive is methyl methacrylate.

7. The blade of claim 1, wherein the resin is a dicyclopentadiene resin.

8. The blade of claim 1, wherein
    the inner and outer cover layers are epoxy and multidirectional fiber prepreg;
    the cap layers are epoxy and unidirectional fiber prepreg; and
    wherein the resin infused shell comprises a sandwich core between inner and outer layers of multiaxial fiber cloth.

9. The blade of claim 8, wherein the adhesive is methyl methacrylate and the resin is a dicyclopentadiene resin.

10. The blade of claim 8, wherein the upper and lower shell parts include at least one of leading and trailing edge flanges bonded by the adhesive to secure the upper shell part to the lower shell part.

11. A method of producing a wind turbine blade comprising steps of:
    molding as an independent part a structural box which is, by weight, made up of more than 75% materials selected from epoxy carbon fiber unidirectional prepreg, epoxy fiberglass unidirectional prepreg, and epoxy basalt fiber unidirectional prepreg;

the structural box includes inner and outer cover layers and between the cover layers, upper and lower cap layers and a sandwich core material serving as sidewalls between the upper and lower cap layers, the inner and outer cover layers are epoxy and multidirectional fiber prepreg, molding as an independent part a shell comprising an upper shell part having an inner layer and a lower shell part having an inner layer, each shell part being manufactured by resin infusion technique using polyester or vinylester;

applying an adhesive that is methyl methacrylate or polyurethane to at least one of the outer surfaces of the structural box or the inner layers of the shell parts and adhesively bonding the structural box between the inner layers of the upper and lower shell parts to form the blade.

12. The method of claim 11, wherein the forming of the structural box uses a semirigid inflatable bladder.

13. The method of claim 11, wherein a mould for forming the shell is coated with gelcoat.

\* \* \* \* \*